Figure 1:
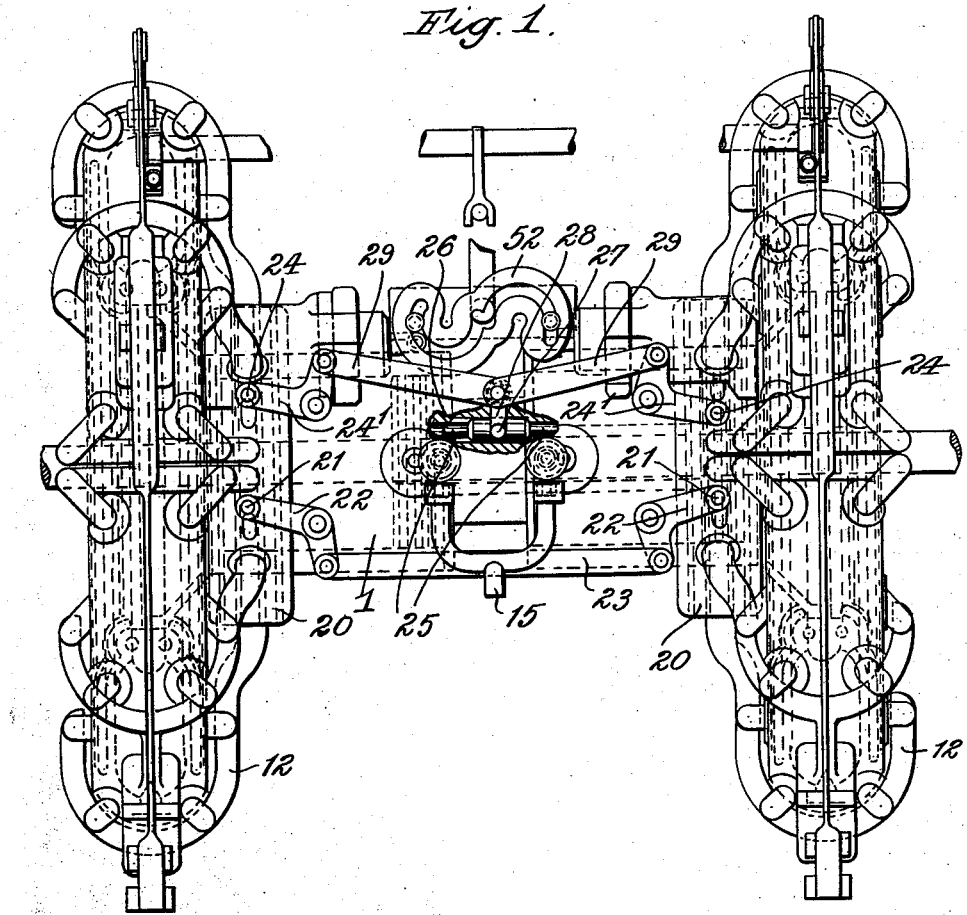

T. H. HOLROYD.
APPARATUS FOR GENERATING PRODUCTS OF COMBUSTION.
APPLICATION FILED APR. 20, 1911.

1,008,825.

Patented Nov. 14, 1911.
9 SHEETS—SHEET 1.

WITNESSES.
Howard P. Ott.
John S. Siggers

INVENTOR,
Thomas H. Holroyd,
BY
E. G. Siggers
ATTY.

T. H. HOLROYD.
APPARATUS FOR GENERATING PRODUCTS OF COMBUSTION.
APPLICATION FILED APR. 20, 1911.

1,008,825.

Patented Nov. 14, 1911.
9 SHEETS—SHEET 2.

WITNESSES.
Howard D. Orr
John A. Siggers

INVENTOR.
Thomas H. Holroyd,
BY E. G. Siggers
ATTY.

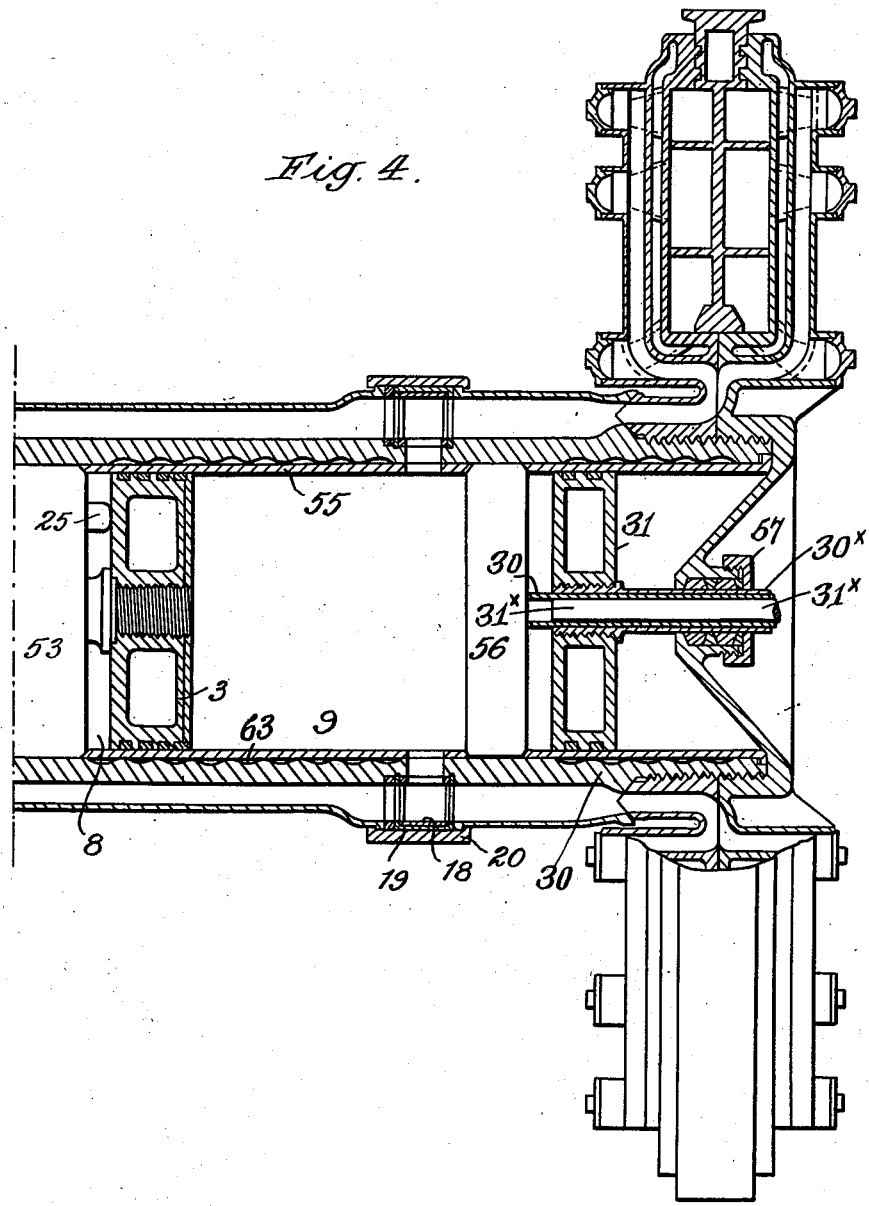

T. H. HOLROYD.
APPARATUS FOR GENERATING PRODUCTS OF COMBUSTION.
APPLICATION FILED APR. 20, 1911.
1,008,825.
Patented Nov. 14, 1911.
9 SHEETS—SHEET 6.
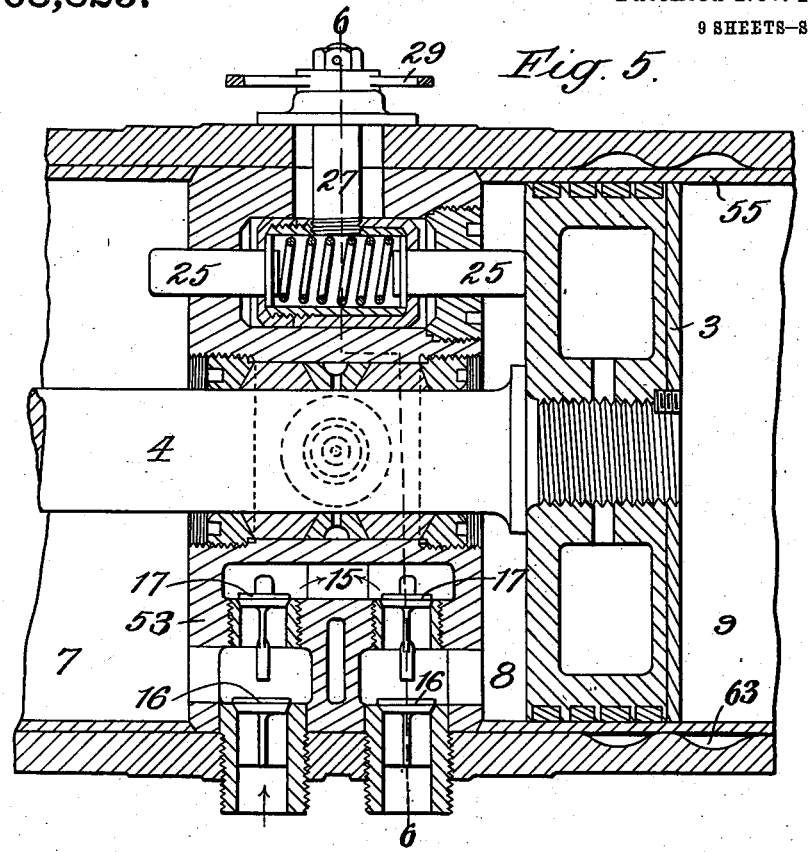
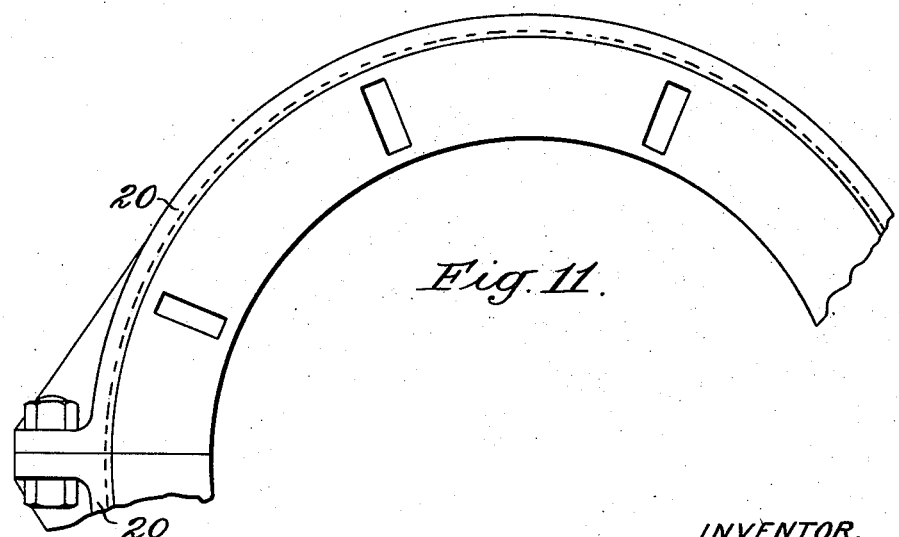
WITNESSES.
INVENTOR,
Thomas H. Holroyd,
BY
ATT'Y.

T. H. HOLROYD.
APPARATUS FOR GENERATING PRODUCTS OF COMBUSTION.
APPLICATION FILED APR. 20, 1911.
1,008,825.
Patented Nov. 14, 1911.
9 SHEETS—SHEET 7.
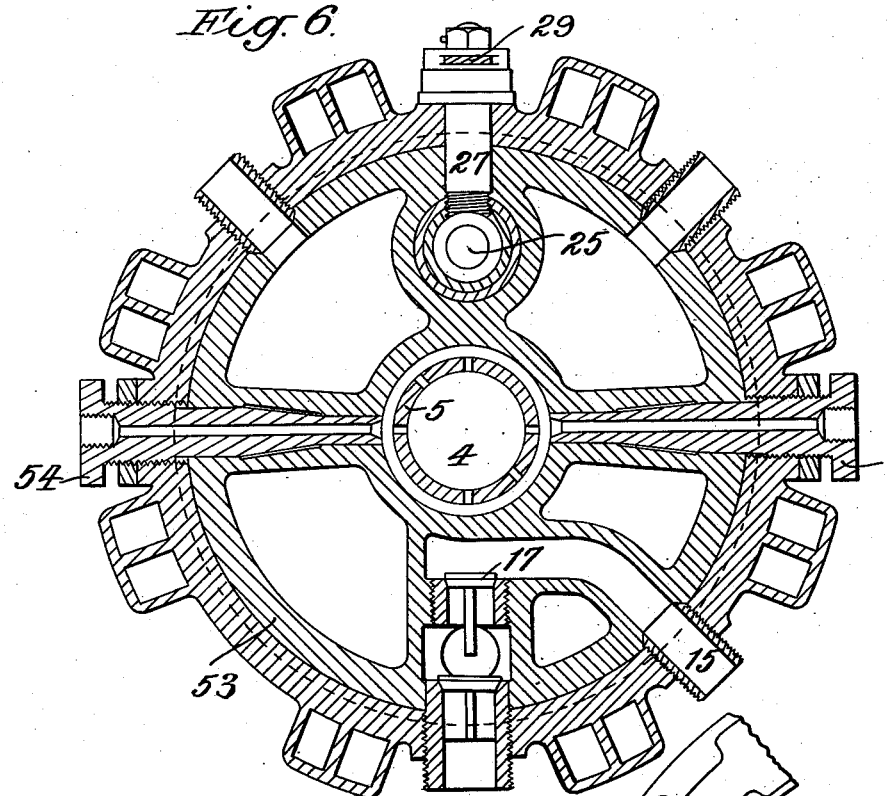
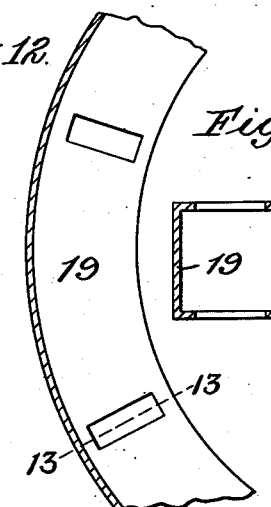
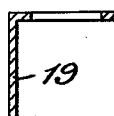
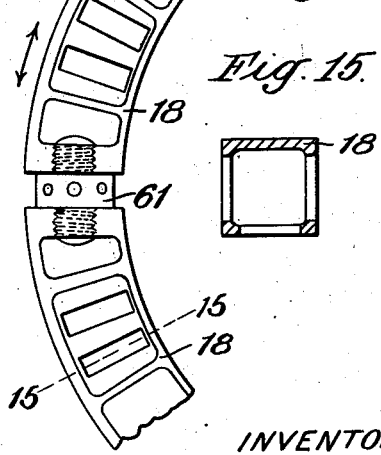
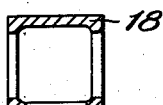
WITNESSES.
INVENTOR.
Thomas H. Holroyd,
BY
ATTY.

T. H. HOLROYD.
APPARATUS FOR GENERATING PRODUCTS OF COMBUSTION.
APPLICATION FILED APR. 20, 1911.
1,008,825.
Patented Nov. 14, 1911.
9 SHEETS—SHEET 8.
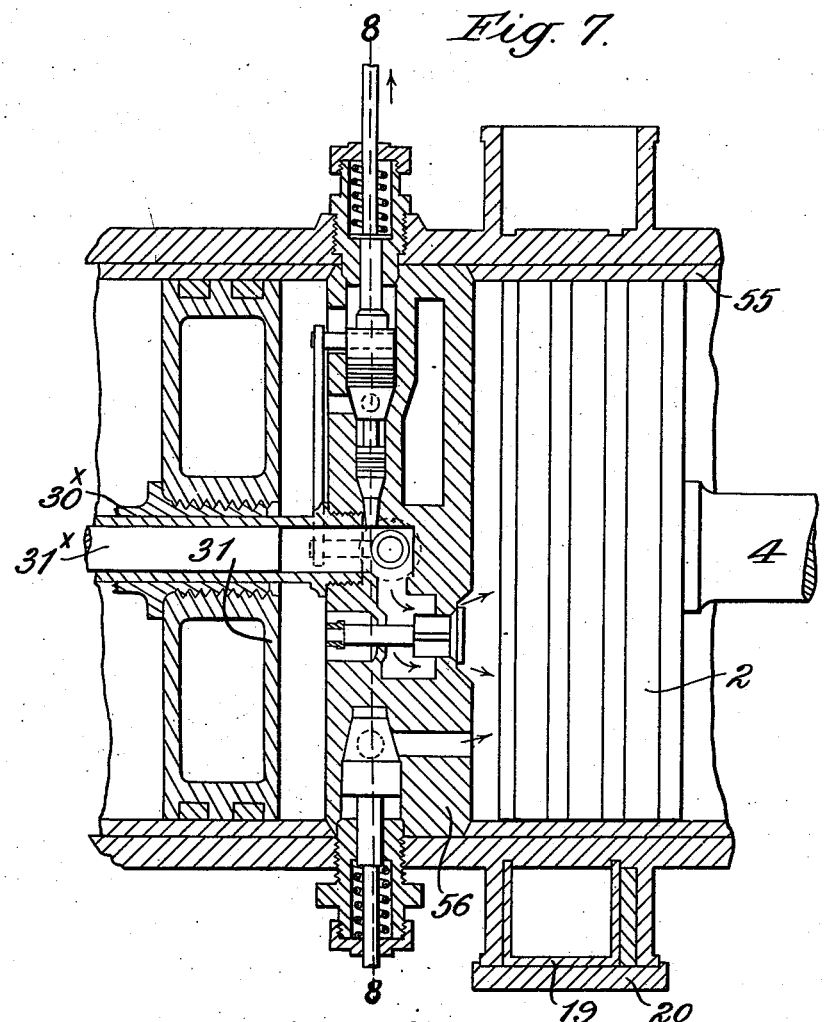
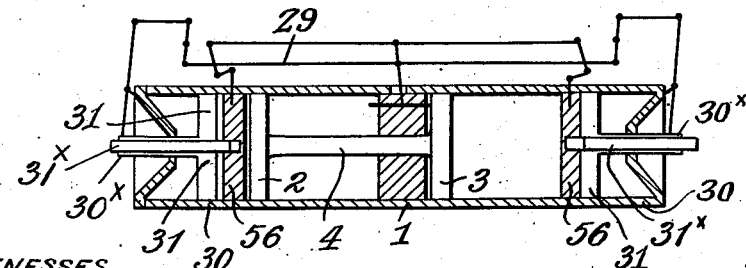
WITNESSES.
INVENTOR,
Thomas H. Holroyd,
BY
ATTY.

T. H. HOLROYD.
APPARATUS FOR GENERATING PRODUCTS OF COMBUSTION.
APPLICATION FILED APR. 20, 1911.

1,008,825.

Patented Nov. 14, 1911.

9 SHEETS—SHEET 9.

WITNESSES.

INVENTOR,
Thomas H. Holroyd,
BY
ATTY.

UNITED STATES PATENT OFFICE.

THOMAS HOWARD HOLROYD, OF RICHMOND, ENGLAND.

APPARATUS FOR GENERATING PRODUCTS OF COMBUSTION.

1,008,825. Specification of Letters Patent. Patented Nov. 14, 1911.

Application filed April 20, 1911. Serial No. 622,400.

*To all whom it may concern:*

Be it known that I, THOMAS HOWARD HOLROYD, a subject of His Majesty the King of England, residing at 34 Morley road, Richmond, in the county of Surrey, Kingdom of England, manager, have invented certain new and useful Improvements in Apparatus for Generating Products of Combustion for Driving Turbines or other Motors, of which the following is a specification.

This invention relates to improvements in apparatus for generating products of combustion and has for its object to provide a compact, light and efficient engine or power generator that shall be capable of application in connection with motors of all kinds where high or low gas or fluid pressure are required for driving purposes.

The type of apparatus to which this invention particularly relates is that in which a plurality of interconnected pistons are mounted in cylinders forming explosion and compression chambers in such a manner that the explosion behind one piston acts directly on another piston to expel the previously exploded products of combustion behind the said other piston, to draw in a fresh charge in another chamber and compress a fresh charge in another.

The invention consists in the hereinafter described construction, arrangement and combination of parts constituting the improved internal combustion pulsating power or pressure generator.

According to my invention I employ a single, double or series of cylinders connected in multiple, twin, cross or tandem form. One end of each cylinder forms a combustion chamber and the other a direct air compressor or hydraulic force pump for indirectly compressing the necessary air for combustion. The explosive mixture which may be any chemical mixture or compound is intermittently supplied to the combustion chamber in adjustable proportions or measured quantities by means of a charge measuring chemical mixing device that is controlled by the operation of the air compressing piston pushing to and fro a slide rod valve required as shown.

Figure 2:
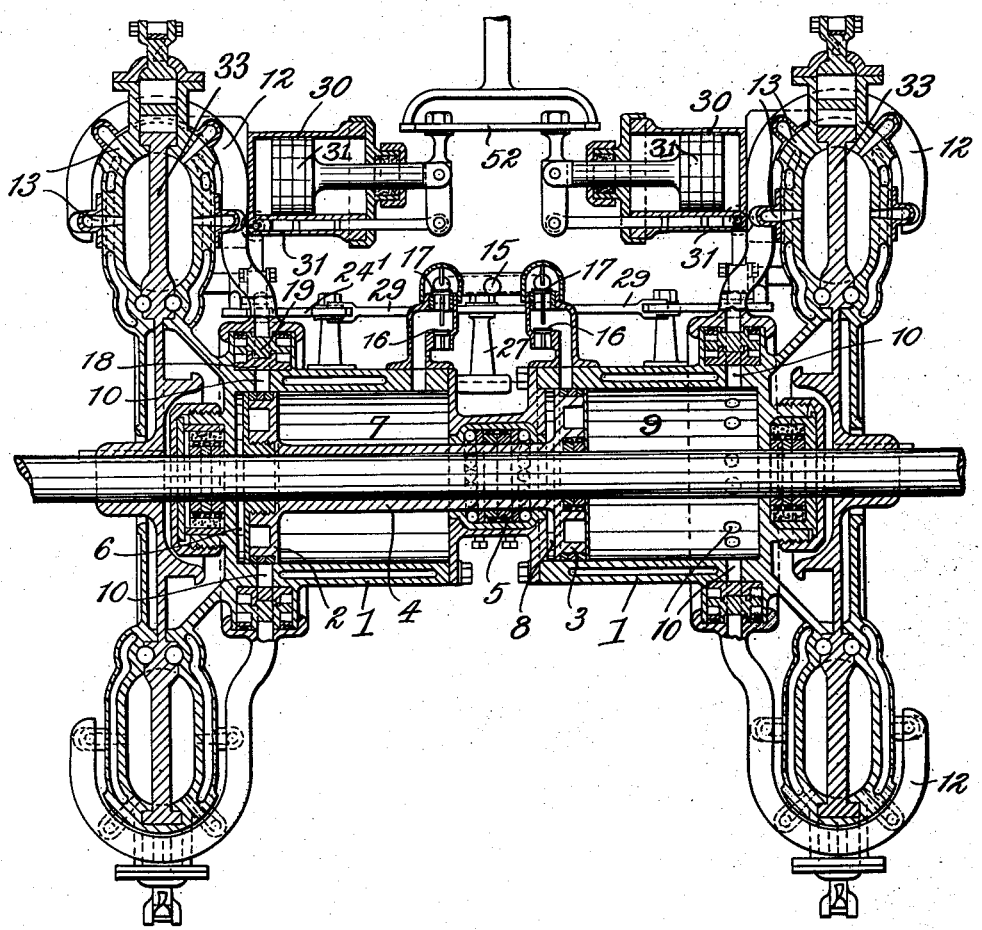
Figure 3:
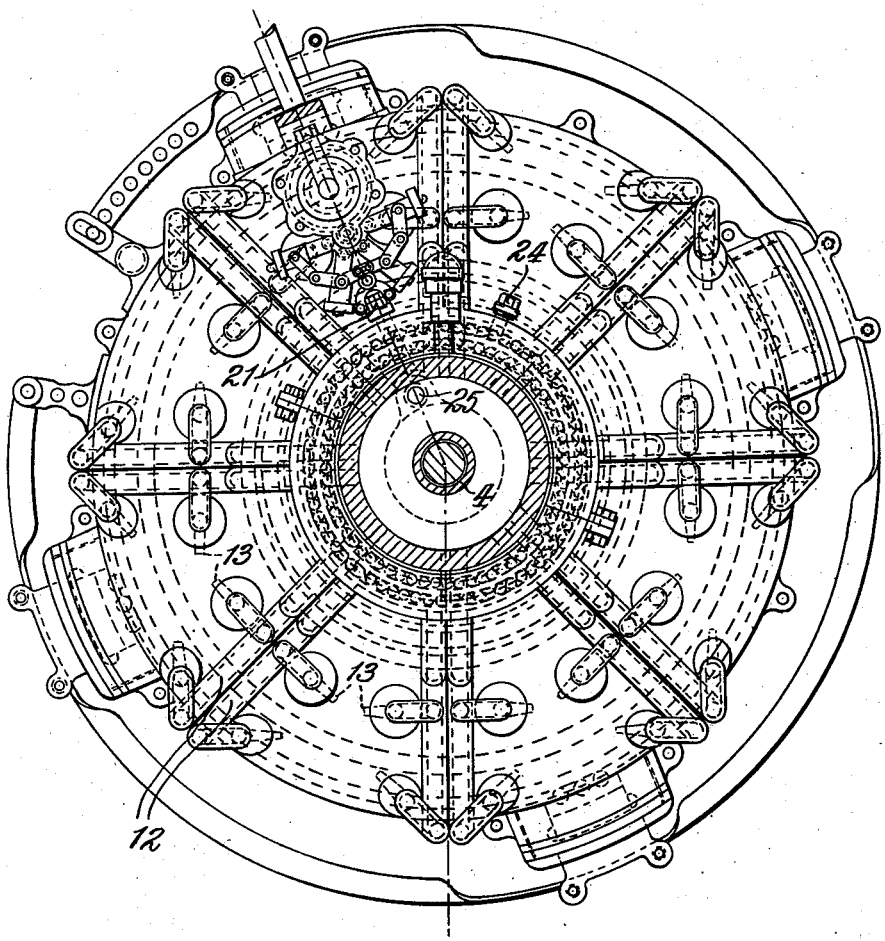
Figure 4:
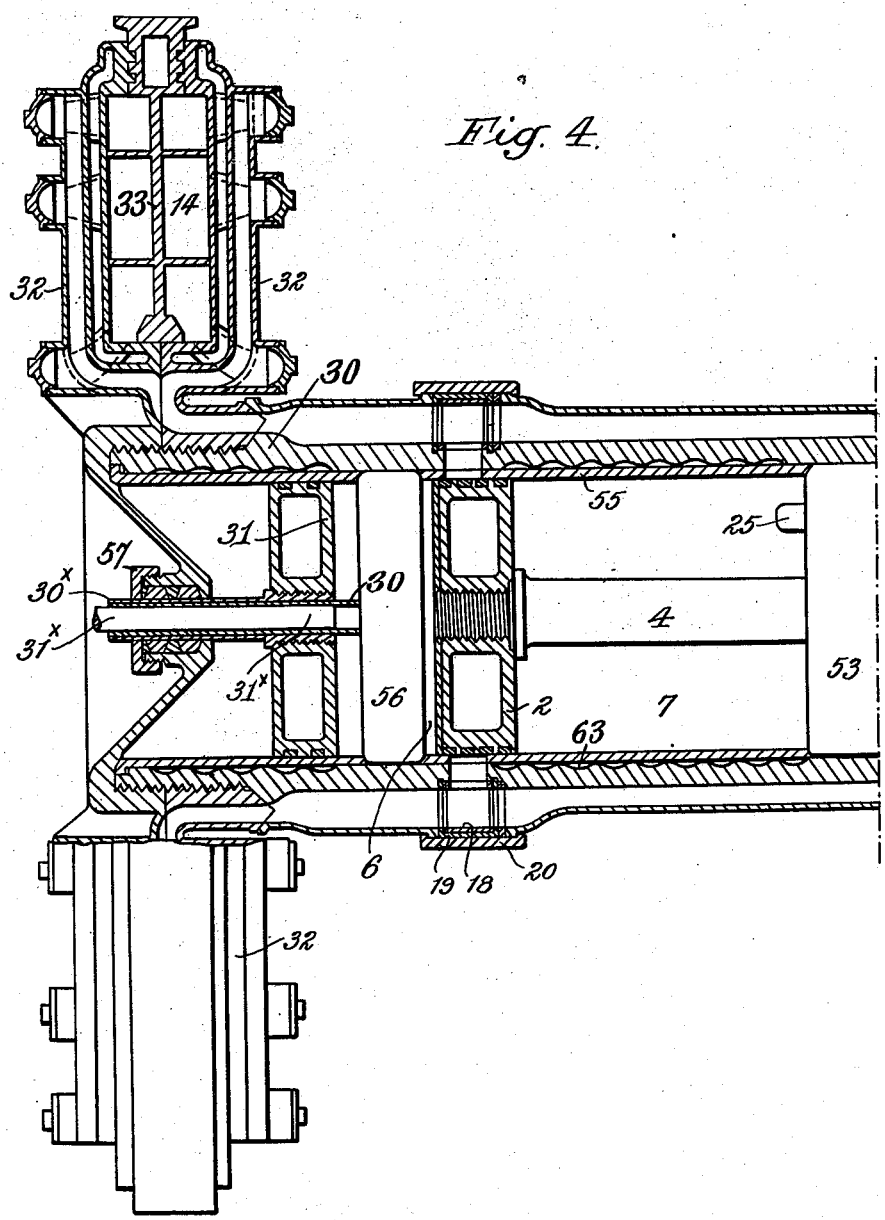
Figure 8:
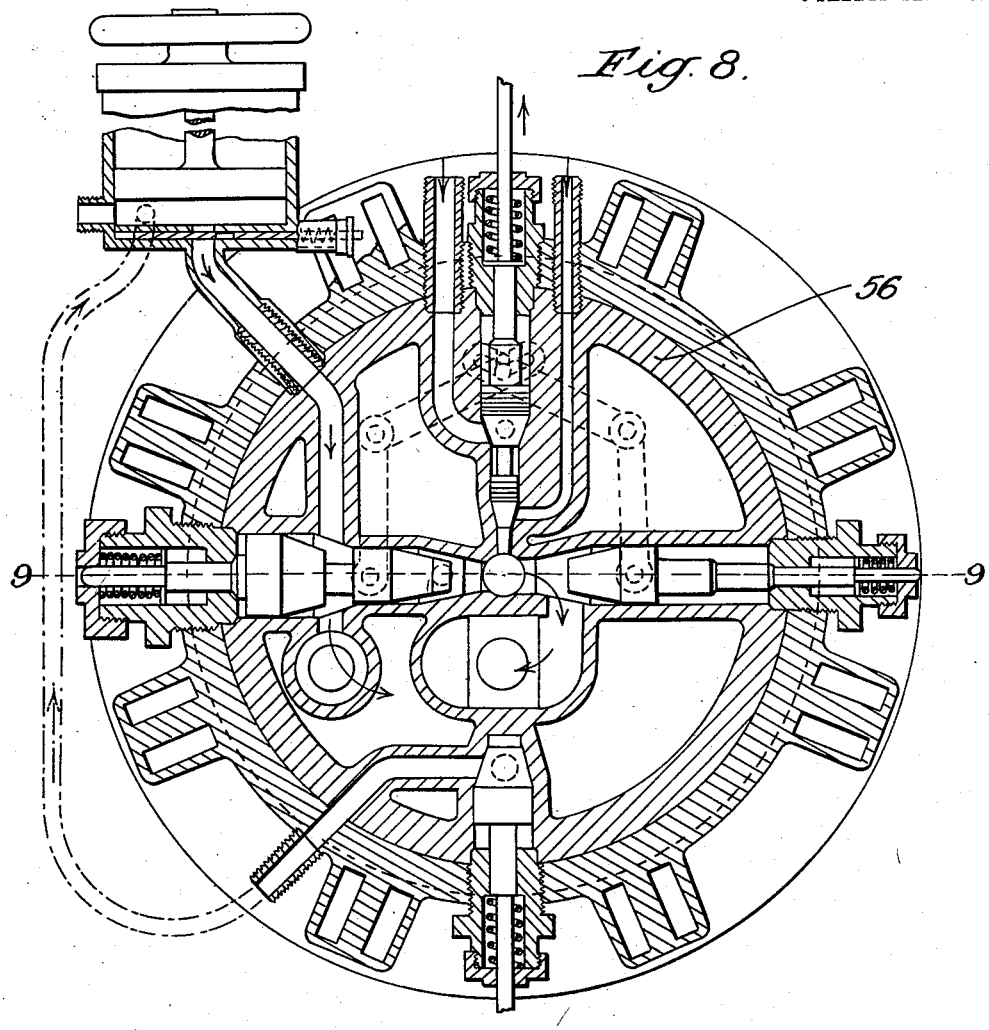
Figure 9:
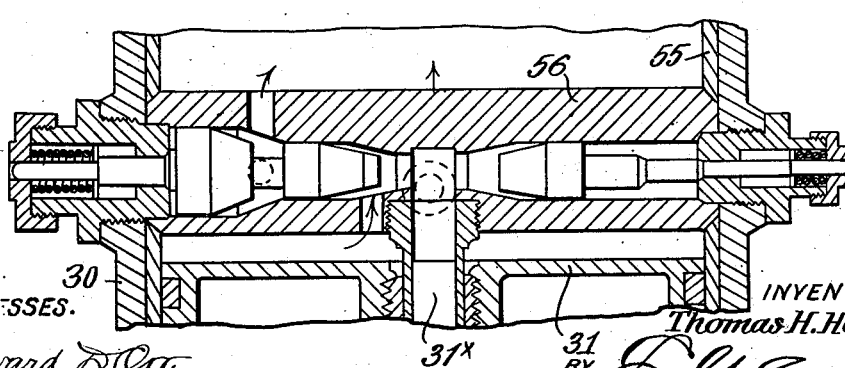

In the accompanying drawings:—Figure 1 is a sectional plan of a power or pressure generator constructed according to my invention and combined with a pair of turbines at its ends. Fig. 2 is a sectional side elevation; Fig. 3 is a sectional end elevation; Fig. 4 is a sectional elevation of a modified form of cylinder construction; Fig. 5 is a diametric section in the direction of the longitudinal axis of the cylinder of Fig. 4 taken through the intermediate division block and a piston adjacent thereto, the showing being on a larger scale than in Fig. 4. Fig. 6 is a section on the line 6—6 of Fig. 5 with the piston rod omitted. Fig. 7 is a section similar to Fig. 5 and on the same scale but taken through the cylinder of the structure of Fig. 4 near one end thereof, and also traversing the division block between the main cylinder and the adjacent measuring cylinder. Fig. 8 is a section on the line 8—8 of Fig. 7. Fig. 9 is a section on the line 9—9 of Fig. 8. Fig. 10 is a diagrammatic view showing the working or general valve arrangements of the structure of Fig. 4. Fig. 11 is an elevation of a portion of one of the valve devices for coupling the explosion chambers to the turbines. Fig. 12 is a section through one of the valve members in a plane perpendicular to the longitudinal axis thereof. Fig. 13 is a section on the line 13—13 of Fig. 12. Fig. 14 is an elevation of a portion of the intermediate member of the valve structure shown in Fig. 11. Fig. 15 is a section on the line 15—15 of Fig. 4.

In carrying out the invention I may employ a cylindrical structure including a pair of co-axially mounted cylinders 1 as in Fig. 1, or one cylinder as in Fig. 4, divided into four parts or distinct chambers 6, 7, 8, 9, preferably although not necessarily of uniform dimensions. A pair of pistons 2, 3 one in each cylinder are connected together by a piston rod 4 passing through a suitable center stuffing or valve box 5 between the two cylinders. One chamber 6, 9, in each cylinder or half thereof forms the combustion or explosion chamber and the other 7, 8, serves for compressing the air for combustion or liquid for indirectly compressing the said air. Additional cylinders may, if desired, be added for this purpose. Ports or motive fluid conduits 10 are formed in the combustion chambers 6, 9 and other portholes for compressed air are cut in the fluid chambers 7, 8. As shown water jacketed motive fluid conduits serve to convey the energy or pressure from the explosion chambers 6, 9 through internal or external conduits 12 to tapered nozzle jets 13· and on to the turbine blade boxes 14 and are so constructed or coupled together to the turbine casings that they will deliver a constant even pressure at any desired or fixed angle to and through the nozzles. A governed air reservoir is suitably coupled up to a branch pipe at 15 (Fig. 2) which communicates through the medium of suction and non-return delivery valves 16, 17, respectively with the air atmosphere and the compressing chambers 7 and 8, from which reservoir (not shown) it is led back to a charge supplying device for admixture with motive fluid and delivered in specific proportions to the combustion or explosion chambers 6 and 9. Both the air and explosive liquid reservoirs are provided with pressure governors and gages. The charges of motive fluid and air are exploded or ignited in any well-known manner by means of magneto or other ignition devices and sparking plugs.

For the purpose of controlling the escape of the exploded gases from the cylinders to the conduits leading to the turbine blades and also the direction of their action thereon I may employ a pair of partially rotating perforated rings or hollow sleeves 18, 19 moving one against the other. The rings 18, 19 are mounted around the outer circumference of the cylinders 1 over the fluid conduit ports 10, 10 therein and on the inside of a channel or cover ring 20 containing or forming the terminating openings of the conduits 12.

An operating pin 21, on the reversing or outer port ring 19 of each cylinder 1 is connected to one end of a bell crank lever 22, the other ends of both of which are coupled together by means of a rod or link 23 that can be controlled by hand for directing the gases to another set of outlet connections. The pin 24 on the other two or inner or outlet port rings 18 is also connected to a bell crank lever 24 but in this case the control is automatic and is determined by the pistons 2, 3 themselves which alternately bear upon the ends of a double ended sliding rod 25, which may either be arranged jointly in a single lug or boss connecting the two inner or adjacent cylinder covers Figs. 1 and 2 or in the central division block (Fig. 4). This rod (or rods) when pushed to either of its extreme positions is adapted to come against a seating 26 in the opposite cylinders end to prevent any passing of gas from one cylinder to the other. Attached to this reciprocating rod is a pin 27 and an arm 28 which is connected through the medium of links 29, 29, with the before mentioned bell crank levers 24 and by this means the exhaust or delivery ports are alternately opened and closed by one of the pistons 2 or 3. This same valve operating rod 25 and gear also serves by additional gear shown on the diagram Fig. 10, to control the feed of the explosive mixture from the charge supplying devices and in some cases also in the known manner a supply or spray of water or other liquid to be vaporized by the explosion for the purpose of increasing the pressure and reducing the heat.

The carbureters or charge mixing devices employed are preferably constructed in the manner described in the specification of my application for Letters Patent No. 622,398, for explosion apparatus for generating and developing power, filed April 20, 1911, and comprise separate measuring cylinders 30 and reciprocating pistons 31 for the air and fuel and in some cases for the measuring of water, and the necessary mechanically controlled valves.

In the modified construction shown in Figs. 4 to 10, where as previously described a "single" subdivided cylinder casting is employed a water jacketed central division piece 53 containing the packing 5 and the slide rod 25 may also contain the suction and non-return delivery air valves 16 and 17 respectively and be fixed in position by means of combined lubricant conductors and fixing pins 54, and cylindrical liners 55. In this case also the charge supplying valves are for convenience of construction arranged inside the cylinder 1 in an additional pair of division blocks 56, 56 and the charge measuring pistons 30, 31, are mounted coaxially on the outside thereof and on the inside of the end covers which are formed by the outer turbine wheel casings 32. The operating piston rods $30^x$ and $31^x$ are brought out coaxially through packings 57 in the end covers 32.

The division blocks 56 are constructed as shown in Figs. 7 and 8 and 9 of the drawings and contain the valve mechanism which is also constructed in the manner described in the specification of my above referred to application for Letters Patent. The circulating or cooling water is adapted to flow by gravity or to be forced around helical conduits or grooves 63 in the inside of the cylinder casing and outside of the cylinder liners and through the water jackets of the division blocks 53 and 56 which jackets are suitably connected therewith for this purpose.

Both the explosion cylinders, 6, 9, the turbine casings 32 and the wheels 33 and their blade boxes 14 are or may be provided with water jackets where required to keep the various working parts cool as is well known in internal combustion engines.

The operation of the combined apparatus is as follows:—To start the engine, the compressed air reservoir connected at 15 is charged with a given pressure and connected with the air measuring chamber of the carbureter or charge measuring device; the explosive fluid reservoir is also charged with liquid. The operator has then only to throw over the lever actuating the circular valve 19 which at the same time pushes over the lever or eccentric 52 which controls the charge measuring valves to permit the admixture of compressed air and explosive fluid and the discharge of the adjusted quantity of explosive gas for ignition in one explosion chamber 6, in combination with water or other cooling liquids, if desired. Immediately on the admission of the explosive mixture to the chamber the magneto ignition device is operated and an explosion takes place, the measured water or liquid that is admitted into the explosion chamber with the explosive fluid is broken up and vaporized instantaneously, thereby considerably reducing the heat caused by the explosion, and intensifying the density of the gaseous mass, generating or developing a large volume of gaseous steam, which is imprisoned so as to produce the necessary pressure to move the pulsating piston one stroke. The term gaseous steam refers to a mixture of combustion products and steam. This movement compresses the air on the other side of the piston in 7 or 8 and discharges compressed air into the air reservoir or other devices at 15 until the back end of the piston comes into contact with one end of the slide rod 25 controlling the valve 18. This movement pushes over the slide rod 25, opens the other charge measuring device valves of the other cylinder, the exhaust back pressure spring valves not shown, regulates the circular valves 18, then instantaneously discharges the contents of the second charge measuring device into the second explosion chamber 9 and by ignition the second explosion takes place which by means of the double-headed piston compounds the first or leading volume of expanding gaseous steam in 6, which is imprisoned until this takes place when it is thereby forced out under great pressure and velocity to the turbines in an even and equalized manner causing a perfect rotary equilibrium. The exploded mixture in the other or second cylinder 9 is imprisoned until the developed or resultant gaseous steam is expelled from the opposite cylinder and the back portion of its own piston 3 compresses the air or water in 8 and reaches and pushes the sliding rod 25 back again. The operation of the rod 25 actuates first an exhaust pressure spring valve, releasing any pressure remaining in the explosion chamber after the ports 10 and conduits 12 are cut off if necessary and this waste pressure may where water is used in place of air, be employed to actuate the valves admitting the liquid or water to the cylinders and for forcing it in under pressure.

This apparatus is adaptable to every class of power generating machine such as motor road or rail vehicles, motor boats, flying machines, aeroplanes and ships, as it enables much complicated gearing and construction to be dispensed with and as a result diminishing friction and reducing upkeep.

What I claim as my invention and desire to secure by Letters Patent is:—

1. An internal combustion apparatus for generating products of combustion for driving turbines or other motors comprising a cylinder structure including two chambers, a pulsating piston rod and a piston at each end forming in each cylinder chamber a combustion chamber and an air compressing chamber for the charge, and valve controlling means actuated directly by the said pistons to control the supply of explosive mixture to the combustion chambers and the supply of air from the air chambers of the reservoir and from the reservoir to the charge measuring device substantially as described.

2. An internal combustion apparatus for generating products of combustion for driving turbines or other motors comprising a cylinder structure including two chambers, a pulsating piston rod and a piston at each end forming in each cylinder chamber a combustion chamber and an air compressing chamber for the charge, and valve controlling means actuated directly by the said pistons to control the supply of explosive mixture to the combustion chambers and the supply of air from the air chambers to the reservoir and from the reservoir to the charge measuring device and circular reciprocating valves actuated directly by the pistons to control the escape of the combustion products from the combustion chambers in which the pistons move substantially as described.

3. An internal combustion pulsating power or pressure generator comprising a single cylinder closed at its ends a central division or valve block dividing said cylinder, a pair of division blocks arranged one on either side of the central block for dividing it into other compartments said blocks containing the charge mixing control valves, a double headed power and air compressing piston and rod moving in the chambers on each side of the central block, additional concentrically arranged charge and air measuring pistons in each end of the cylinders and means for operating the charge supplying valves and pistons and the air inlet valves in time with the movement of the main pistons substantially as described.

In testimony whereof I have hereunto set my hand in the presence of two subscribing witnesses this 10th day of March 1911.

T. HOWARD HOLROYD.

Witnesses:
J. S. WITHERS,
T. BLAKEY.